T. C. MORGAN.
HEATER FOR WASHING MACHINES AND THE LIKE.
APPLICATION FILED DEC. 10, 1910.

1,033,113.

Patented July 23, 1912.

WITNESSES

INVENTOR
Thomas C. Morgan
BY Mason, Fenwick Lawrence
his ATTORNEYS.

_

UNITED STATES PATENT OFFICE.

THOMAS C. MORGAN, OF SPOKANE, WASHINGTON, ASSIGNOR OF ONE-HALF TO HAROLD L. SCRANTON, OF SPOKANE, WASHINGTON.

HEATER FOR WASHING-MACHINES AND THE LIKE.

1,033,113.  Specification of Letters Patent.  Patented July 23, 1912.

Application filed December 10, 1910. Serial No. 596,673.

*To all whom it may concern:*

Be it known that I, THOMAS C. MORGAN, a citizen of the United States, residing at Spokane, in the county of Spokane and State of Washington, have invented certain new and useful Improvements in Heaters for Washing-Machines and the Like; and I do hereby declare the following to be a full, clear, and exact description of the invention, such as will enable others skilled in the art to which it appertains to make and use the same.

This invention relates to improvements in heaters, and particularly to heaters for heating the water in washing machines and the like.

The object in view is the arrangement of an improved heater at the bottom of a washing machine, tub, or the like, associated with means for permitting a circulation of water and steam for agitating and heating the water in the device to which the heater is attached.

Another object of the invention is the arrangement in a water heater, of improved means for causing a proper circulation of water and the distributing of the heated water and steam beneath a volume of water.

A further object of the invention is the arrangement of a heater formed with a substantially dish-shaped housing having a plurality of walls spaced apart for permitting the passage of water therethrough, arranged to act in conjunction with the heater located substantially in the space inclosed by the dish-shaped housing for quickly heating the substantially thin sheet of water between the walls of the housing.

A still further object of the invention is the arrangement in the heater for washing machines, of a heating device arranged with a thin space beneath which the heater is positioned for heating the water passed therethrough, the heated water flowing upward through a guiding means which holds clothes or the like from off the discharge opening.

With these and other objects in view the invention comprises certain novel constructions, combinations and arrangement of parts as will be hereinafter more fully described and claimed.

Figure 1:
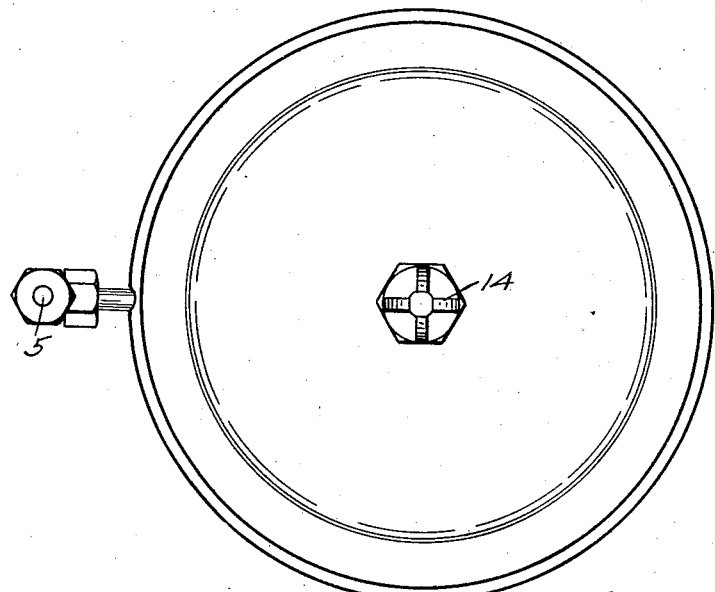
Figure 2:
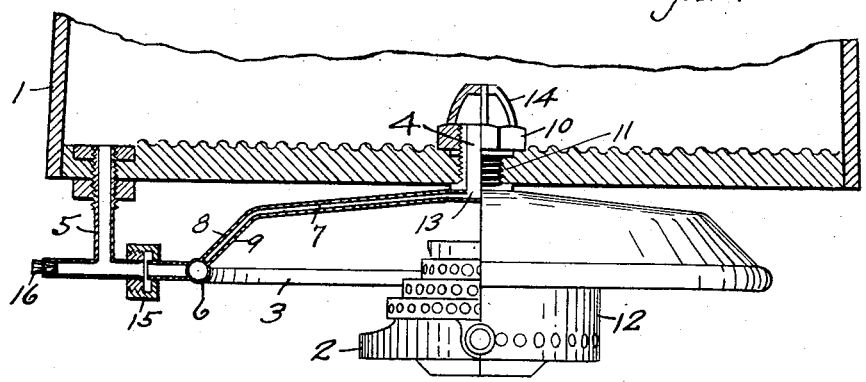

In the accompanying drawings: Figure 1 is a top plan view of a heater embodying the invention. Fig. 2 is a longitudinal sectional view through a washing machine or tub with a heater embodying the invention connected therewith, certain parts of the heater being shown in section for better illustrating the same.

In forming a device according to the present invention a tub or washing machine of any desired kind is provided with a plurality of apertures, preferably a central aperture and an aperture near the periphery, the apertures being arranged in the bottom for receiving a discharge member and an intake member. The water in the tub is arranged to pass downward through the discharge member near the periphery of the tub, and from thence into a heater arranged below the central aperture. As the water enters the heater the same is spread into a thin sheet directly above a device projecting a flame in proximity to the sheet of water, so as to thoroughly heat the same previous to its discharge into the inlet member. By this arrangement a continuous circulation of water is maintained, the water escaping from the heater partially steam and partially heated water.

In order that the invention may be more clearly understood an embodiment of the same is shown in the accompanying drawings, in which—

1 indicates a tub of any desired kind, either applied to a washing machine or for other purposes, to which the heater is secured. The heater comprises a burner structure 2, a spreading member or housing 3, an inlet device 4, and an outlet device 5.

The burner 2 may be of any desired structure, either oil or gasolene burning type, or any other convenient form, which may apply heat to the housing 3. The housing 3 is substantially an inverted dish-shaped structure having an enlarged peripheral opening 6, which acts as a supply-passage way for the opening 7 between plates 8 and 9. The opening 7 is very small so that a thin sheet of water is provided between plates 8 and 9 in order to be easily heated by burner 2. Also by the shape of housing 3 the heat is localized so as to be substantially all absorbed by the water previous to its discharge from member 4. Member 4 may be secured to housing 3 in any desired manner, but has the interior bore thereof in free communication with opening 7 so that water may be discharged freely into tub 1.

A nut 10 is threaded on to the stem 11 of member 4 for securely binding member 4 in position, and for supporting the housing 3 and burner 2 beneath tub 1, burner 2 having a hood 12 connecting the same and housing 3. If desired the opening at 13, for permitting water to flow from opening 7 to the bore of member 4, may be a single opening or may consist of a plurality of perforations as desired for permitting the water to percolate into member 4 or freely discharge therein. Nut 10 is provided with a spider construction 14 for supporting clothes or the like above and away from the discharge opening of member 4, so that the steam and water may freely pass therefrom into tub 1.

In order to supply the passage-way 6 with water the same is connected with discharge member 5 by a coupling 15. Discharge member 5 is provided with a vent 16 for draining the tub 1 whenever desired. Ordinarily a plug or stopper of some kind is arranged at the end of vent 16 for normally preventing any discharge at this point. By this structure the water at the periphery of the tub, which is comparatively cool, will descend in considerable volume and maintain passage-way 6 full of water under a slight pressure which will cause the water to spread out and fill opening 7 where it is heated, and, by natural action, passes upward through the bore of member 4 into the central part of tub 1. This action is continued as long as burner 2 is being used.

What I claim is:

The combination with a tub, of a burner disposed beneath the tub and concentric therewith, communication through the bottom of said tub adjacent to the periphery thereof to a conical chamber, an enlarged passage about the rim of said chamber to receive a quantity of water from said tub, the walls of said chamber above said rim being formed of thin material and positioned in near proximity to one another so as to cause a thin film of water to rise from the enlarged recess about the rim of said chamber, communication from the apex of said conical chamber through the center of the bottom of the tub and a spider disposed above said opening to prevent any obstruction of the passage.

In testimony whereof I affix my signature in presence of two witnesses.

THOMAS C. MORGAN.

Witnesses:
HAROLD L. SCRANTON,
HERBERT E. SMITH.

---

Copies of this patent may be obtained for five cents each, by addressing the "Commissioner of Patents, Washington, D. C."